May 15, 1951 — C. S. METSGER — 2,553,202
STARTER-GENERATOR GEARING
Filed May 25, 1949
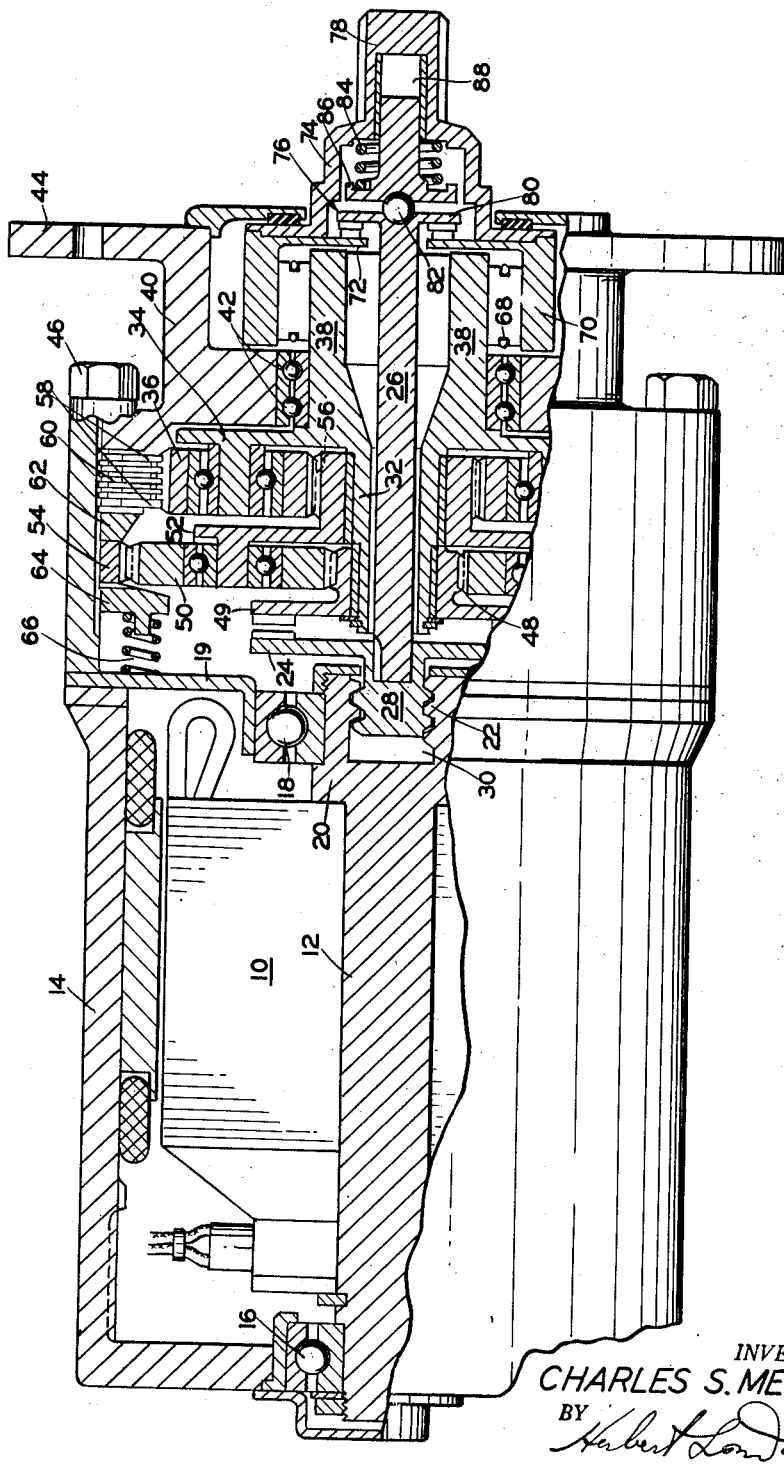
INVENTOR.
CHARLES S. METSGER
BY Herbert Lon Davis Jr.
ATTORNEY Patented May 15, 1951

2,553,202

UNITED STATES PATENT OFFICE 2,553,202

STARTER-GENERATOR GEARING

Charles S. Metsger, Morris Plains, N. J., assignor to Bendix Aviation Corporation, Teterboro, N. J., a corporation of Delaware Application May 25, 1949, Serial No. 95,253

6 Claims. (Cl. 74—810)

The present invention relates to engine starters and generator means and more particularly to means adapting a dynamo-electric machine for operation both as a motor for starting the engine and as a generator driven by the engine.

Various means for adapting a dynamo-electric machine for operation both as a motor and as a generator have been proposed but the objections to such proposed means generally have been that they are bulky and complicated with an undue number of parts and that they require modification of engine and engine housing including the necessity of employing expensive and cumbersome bevel gears and gear boxes.

It is an object of the present invention to avoid the disadvantages of apparatus of the aforesaid character and to do so by novel and effective means.

Another object of the present invention is to provide simple, inexpensive and novel means whereby a dynamoelectric machine may be used both as a starter motor and as a generator.

Another object is to provide novel engine starter and generator means which are readily adapted for mounting on engines of different existing types without necessitating modifications of such engine either on the mount provided for a starter or on the mount provided for the generator.

Another object is to provide an engine starter generator in which the starter gearing is disconnected and at rest during the generating period thereby greatly prolonging the useful life of the starter.

The above and other objects and features of the invention will appear more fully hereinafter from a consideration of the following description taken in connection with the accompanying drawing wherein one embodiment of the invention is illustrated by way of example.

The single figure of the drawing is a view partly in section and partly in elevation of the novel starter-generator device of the present invention. The dynamo-electric machine generally indicated at 10 is mounted on motor shaft 12 journaled within motor housing portion 14 by ball bearings 16 mounted in the housing 14 and bearing 18 mounted in an inwardly extending wall portion 19 as shown. Expanded section 20 of shaft 12 is counterbored and is provided with internal long lead threads 22. A disc clutch member 24 is mounted on and securely splined to a pencil shaft 26 and provided with an axially extending externally threaded hub portion 28 adapted to be threaded into the counterbore 30 of expanded section 20. Pencil shaft 26 passes through an axially extending sleeve portion 32 of spider or planet cage 34 carrying one or more planet gears 36. Shown integral with the planet cage 34 is a stub shaft 38 journaled in gear housing portion 40 by ball bearings 42. Gear housing portion 40 is provided with an outwardly extending flange 44 for mounting on an engine and is secured to motor housing portion 14 by a plurality of bolts 46.

Pinion 48 is journaled externally on sleeve portion 32 of planet cage 34 and has integral therewith a disc-like clutch member 49 adapted to cooperate with clutch member 24. Pinion 48 forms part of a planetary gear train comprising one or more planet gears 50 rotatably mounted on a spider or planet cage 52 and meshing with a stationary orbit gear 54 and pinion or sun gear 48. Pinion 56 is shown as being integral with spider or planet cage 52 and journaled externally to sleeve portion 32 of planet cage 34. Pinion 56 forms the sun gear of a planetary gear train comprising the sun gear 56, planets 36 carried by cage 32 and orbit gear 58. Orbit gear 58 is made up of one set of discs of an interleaved torque limiting disc pack 60, the other set of discs being splined to gear housing portion 40. Pressure plate 62, orbit gear 54 and ring member 64 are axially slidably splined to gear housing portion 40 and adapted to transmit the pressure of compression spring 66 abutting wall 19 to the disc pack.

Surrounding stub shaft 38 and connected thereto by a one-way clutch 68 such as an overrunning sprag type clutch illustrated, is a cylindrical member 70 having an inwardly extending flange 72. Drivingly secured to the cylindrical member 70 is an engine engaging member 74 enclosing a clutch 76 and having a splined extension 78 for engagement with an engine to be started.

Pencil shaft 26 is terminated in an outwardly extending flange 80 having secured thereto a friction pad forming one clutch element of friction clutch 76 and adapted to cooperate with a friction pad mounted on flange 72 which serves as the other clutch element. The pencil shaft is held in a centered position by a ball 82 resting in a spherical recess therein and biased to the left as viewed in the drawing by a spring 84 compressed between engine engaging member 74 and presure member 86. The pressure member 86 is slidably mounted in a bore 88 within the engine engaging member and adapted to press against ball 82 and provided with a recess for receiving it.

The operation of the above described motor generator device is as follows:

With the device mounted on the standard mounting pad of the engine, spline 78 in driving engagement with an engine member, and the parts of the device being at rest in the position shown in the drawing, motor 10 is energized to crank the engine. As shaft 12 begins to rotate, hub 28 will remain stationary because of the restraining force exerted thereon from the engine through clutch 76 and pencil shaft 26 and is forced to the right as viewed in the drawing against the biasing force of spring 84 by the long-lead internal threads 22 of shaft 12 engaging the external threads of hub 28. As the pencil shaft 26 moves to the right, clutch member 24 engages clutch member 49 and at the same time clutch 76 is disengaged to permit pencil shaft 26 to rotate freely with respect to engine engaging member 74 on ball 82. Rotation of clutch member 49 and pinion 48 connected thereto will cause spider or planet cage 52 to rotate through the planet gear train comprising sun gear 48, orbit gear 54 and planet gears 50 in a manner well known in the art. Rotation of planet cage 52 and hence pinion 56 will cause rotation of planet cage 34 through a second planetary gearing comprising pinion 56 acting as the sun gear, orbit gear 58 and planet gears 36 in mesh therewith. Planet cage 34 will crank the engine through stub shaft 38, one-way clutch 68, cylindrical member 70 and splined engine engaging member 78.

When the engine fires it will drive cylindrical member 70 faster than stub shaft 38 and hence overrun one-way clutch 68. As soon as the starter motor is deenergized, spring 84 will force pencil shaft 26 and hence clutch member 24 to the left, as viewed in the drawing, whereby clutch members 24 and 49 will separate and clutch 76 will close thereby establishing driving connection from the engine to the motor through the pencil shaft. In this connection, it should be noted that the starter reduction gearing is at rest during the operation of the device as a generator and thus is not subject to wear during such operation.

If during cranking operation, the engine should abnormally resist cranking or if it should backfire, orbit gear 58 consisting of one set of interleaved friction discs of disc pack 60 will slip relative to the other set of discs which is splined to the gear housing 40 and thus protect the gearing from overloading.

Depending on the particular application for which the device is to be used, it may be found desirable to add another stage of planetary gearing or use only one stage. Any type of uni-directional clutch may be used for the illustrated sprag type overrunning clutch 68 and various types of clutches in and of themselves old in the art may be substituted for clutches 76 and 24, 49.

Although only one embodiment of the invention has been illustrated and described, various changes in the form and relative arrangements of the parts may be made to suit requirements.

What is claimed is:

1. In combination with a dynamo-electric machine including an internally threaded counterbored shaft, a pencil shaft in threaded engagement with said shaft, an engine engaging member, and a uni-directional clutch, a reduction gearing in driving connection with said engine engaging member through said uni-directional clutch, clutch means adapted simultaneously to engage said machine to said reduction gearing and to disengage said pencil shaft from said engine engaging member establishing driving connection between said machine to said engine through said reduction gearing, uni-directional clutch and engine engaging member, and adapted to disengage said reduction gearing from said machine and engage said pencil shaft to said engine engaging member to establish driving connection between said engine engaging member and said machine to drive the latter from the engine when it fires.

2. In a starter-generator device, a dynamo-electric machine, an engine engaging member, a one-way clutch, a reduction gearing having an output member connected to said engine engaging member through said one-way clutch, a driving connection including a clutch member normally biased to an engaging position for connecting said engine engaging member to said machine, means responsive to the relative rotational speed of said machine and said output member for overcoming said bias to disengage said driving connection, and other clutching means responsive to said last means to connect said machine to said reduction gearing during the cranking operation.

3. In a starter-generator device, the combination with a dynamo-electric machine having an output shaft of a reduction gearing having an input and an output member, a clutch element carried by said input member, an engine engaging member, one-way clutch means connecting the output member of said reduction gearing with said engine engaging member, a pencil shaft in long-lead threaded engagement with said shaft and adjacent one end thereof carrying a clutch element adapted to cooperate with said first mentioned clutch element in response to axial movements of said pencil shaft, means for biasing said pencil shaft in a direction to separate said clutch elements, clutch surface carried by said pencil shaft adjacent the other end thereof, adapted to cooperate with a second clutch surface carried by said output member, said pencil shaft being adapted to be moved axially by the threaded engagement with said machine shaft to engage said clutch element against said biasing means and to separate said clutch surfaces upon energization of said machine to crank said engine and to be moved axially in the opposite direction by said biasing means when said engine starts to separate said clutch elements and engage said clutch surfaces.

4. In a starter-generator device, a housing, a dynamo-electric machine including a shaft, a reduction gearing means having an input member and including a planetary gearing comprising a sun gear, planet gear and orbit gear, said orbit gear comprising one set of discs of an interleaved torque limiting disc pack, the other set of discs being splined to said housing, a rotatable planet gear cage carrying said planet gear and engine engaging member, overrunning clutch means connecting said cage to said engine engaging member, a pencil shaft carrying oppositely facing clutch elements, a clutch member drivingly connected to said reduction gearing input member adapted to engage one of said clutch elements in one axial position of said pencil shaft, a second clutch member drivingly connected to said engine engaging member and adapted to engage the other of said clutch elements in another axial position of said pencil shaft, and means for shifting said pencil shaft from one position to the other whereby driving connection between said machine and said engine engaging member is established during the cranking phase through said reduction gearing and overrunning clutch, and driving connection between said engine engaging member and said machine is established after the engine starts thereby driving said machine as a generator.

5. In a starter-generator device, a housing, a dynamo-electric machine including a shaft, a reduction gearing means having an input member and including a planetary gearing comprising a sun gear, planet gear and orbit gear, a rotatable planet gear cage carrying said planet gear, an engine engaging member, overrunning clutch means connecting said cage to said engine engaging member, a pencil shaft carrying oppositely facing clutch elements, a clutch member drivingly connected to said reduction gearing input member adapted to engage one of said clutch elements in one axial position of said pencil shaft, a second clutch member drivingly connected to said engine engaging member and adapted to engage the other of said clutch elements in another axial position of said pencil shaft, and means for shifting said pencil shaft from one position to the other whereby driving connection between said machines and said engine engaging member is established during the cranking phase through said reduction gearing and overrunning clutch, and driving connection between said engine engaging member and said machine is established after the engine starts thereby driving said machine as a generator.

6. Starter-generator device comprising in combination a dynamo-electric machine, an engine engaging member, a clutch member connected to said engine engaging member, a reduction gearing having an input member and an output member, said output member detachably connected to said engine engaging member adapted to disengage when the rotational speed of said engine engaging member exceeds the speed of said output member, a second clutch member connected to said input member, an axially movable shaft, a pair of oppositely facing clutch elements carried by said shaft and movable therewith, one of said clutch elements cooperating with said first mentioned clutch member to form one clutch, the other of said clutch elements cooperating with said second clutch member to form a second clutch, said one clutch being engaged and the other open at one position of the movable shaft, said one clutch being open and the other engaged at another position of said shaft, means normally biasing said shaft into said one position, and means responsive to initial rotation of said motor to shift said shaft into said second position for cranking operation, said biasing means being adapted to move said shaft into said second position when said engine starts.

CHARLES S. METSGER.

REFERENCES CITED

The following references are of record in the file of this patent:

UNITED STATES PATENTS

| Number | Name | Date |
|---|---|---|
| 2,466,461 | Mauric et al. | Apr. 5, 1949 |